United States Patent
Larkin

(10) Patent No.: US 8,337,039 B1
(45) Date of Patent: Dec. 25, 2012

(54) WINDOW FRAME WITH INTEGRATED SOLAR ELECTRIC CELL AND ILLUMINATION

(76) Inventor: Kevin B. Larkin, Pebble Beach, CA (US)

( * ) Notice: Subject to any disclaimer, the term of this patent is extended or adjusted under 35 U.S.C. 154(b) by 1063 days.

(21) Appl. No.: 12/200,910

(22) Filed: Aug. 28, 2008

(51) Int. Cl.
*F21L 13/00* (2006.01)

(52) U.S. Cl. ........ 362/192; 362/183; 362/145; 136/246; 136/248; 136/244; 52/235; 52/173.3

(58) Field of Classification Search .................. 362/183, 362/145, 192; 136/246, 244, 248; 52/235, 52/173.3
See application file for complete search history.

(56) References Cited

U.S. PATENT DOCUMENTS

| | | | |
|---|---|---|---|
| 3,634,845 A * | 1/1972 | Colman | 340/508 |
| 4,080,221 A * | 3/1978 | Manelas | 136/248 |
| 4,294,038 A | 10/1981 | Davidson | |
| 4,515,150 A | 5/1985 | Dyson et al. | |
| 5,029,342 A | 7/1991 | Stein et al. | |
| 5,221,363 A | 6/1993 | Gillard | |
| 5,413,161 A | 5/1995 | Corazzini | |
| 6,646,196 B2 * | 11/2003 | Fronek et al. | 136/251 |
| 6,952,165 B2 | 10/2005 | Kovach et al. | |
| 7,190,531 B2 | 3/2007 | Dyson et al. | |

* cited by examiner

*Primary Examiner* — Ali Alavi
(74) *Attorney, Agent, or Firm* — Morgan, Lewis & Bockius LLP

(57) ABSTRACT

A window frame features solar electric cells on its exterior side that provide solar electricity for buffer storage in rechargeable batteries housed also in the window frame. Also integrated in the window frame are light emitting diodes that are activated during absence of daylight and powered from the solar electricity stored in the batteries. In that way a simple and compact system is provided for solar powered interior lighting that may be easily maintained and retrofitted in existing buildings.

17 Claims, 6 Drawing Sheets

WINDOW FRAME WITH INTEGRATED SOLAR ELECTRIC CELL AND ILLUMINATION

FIELD OF INVENTION

The present invention relates to windows and window frames with integrated solar electric cells and Illumination.

BACKGROUND OF INVENTION

Increasing energy costs as well as reoccurring power outages particular during times of intense solar radiation and corresponding generally high power consumption for air conditioning make it necessary to provide independent alternate sources of electrical power to buildings. A well known solution is to mount arrays of solar electric cells on a building's roof. Efficiency of solar electric cells depends highly on the cleanliness of their sun exposed surfaces. Dust and debris such as from surrounding trees need to be periodically removed from the solar electric cells. Unfortunately, roof mounted solar electric cells are difficult to access for cleaning. Therefore, there exists a need for solar electric cells being mounted at more accessible locations. The present invention addresses this need.

Roof mounted solar electric systems are commercially available in large and expensive units that are often esthetically displeasing. Therefore, there exists a need for a compact solar electricity providing device and system that can be easily integrated or retrofitted in existing buildings in an esthetically pleasing fashion. The present invention addresses also this need.

Emergency indoor illumination is commonly powered by batteries that may be insufficient in cases of power outages lasting several days. Therefore, there exists a need for an indoor illumination system capable of providing emergency illumination over extended periods of time without need for battery replacement. The present invention addresses also this need.

SUMMARY OF INVENTION

A window frame configured for mounting in a building has an exterior side that may be exposed to sun irradiation. On that exterior side one or more solar electric cells may be mounted to capture the sun light and transforming it into electrical energy as is well known in the art. A control circuit in conductive connection with the solar electric cell passes the solar electric energy either to a battery and/or to high energy efficient light emitting diodes on the frame's interior side. The control circuit may be controlled by a mechanical switch on the frame, a motion sensor or any other well known means to selectively turn on and off lights. Since window frames are commonly designed as hollow profiles, the control circuit as well as cabling, batteries and light emitting diodes are easily integrated into existing window frames. The window frame may be rigidly mounted or may feature hinges to be opened and closed. The window frame with all integrated parts may be easily retro fitted into existing buildings as a compact solar electricity providing device. The solar electric cells may be conveniently accessible to be cleaned together with the window glass. During daylight, the solar electric cells charge the batteries while sunlight through the window glass substitutes the light emitting diodes. In the absence of sufficient daylight, the light emitting diodes may be selectively activated by the light switching device and powered by the batteries. The solar electric cells are integrated in the window frame in an esthetically pleasing fashion without changing the windows overall shape. Cleaning of the solar electric cells may be easily accomplished together with regular window cleaning.

DETAILED DESCRIPTION

Figure 6:
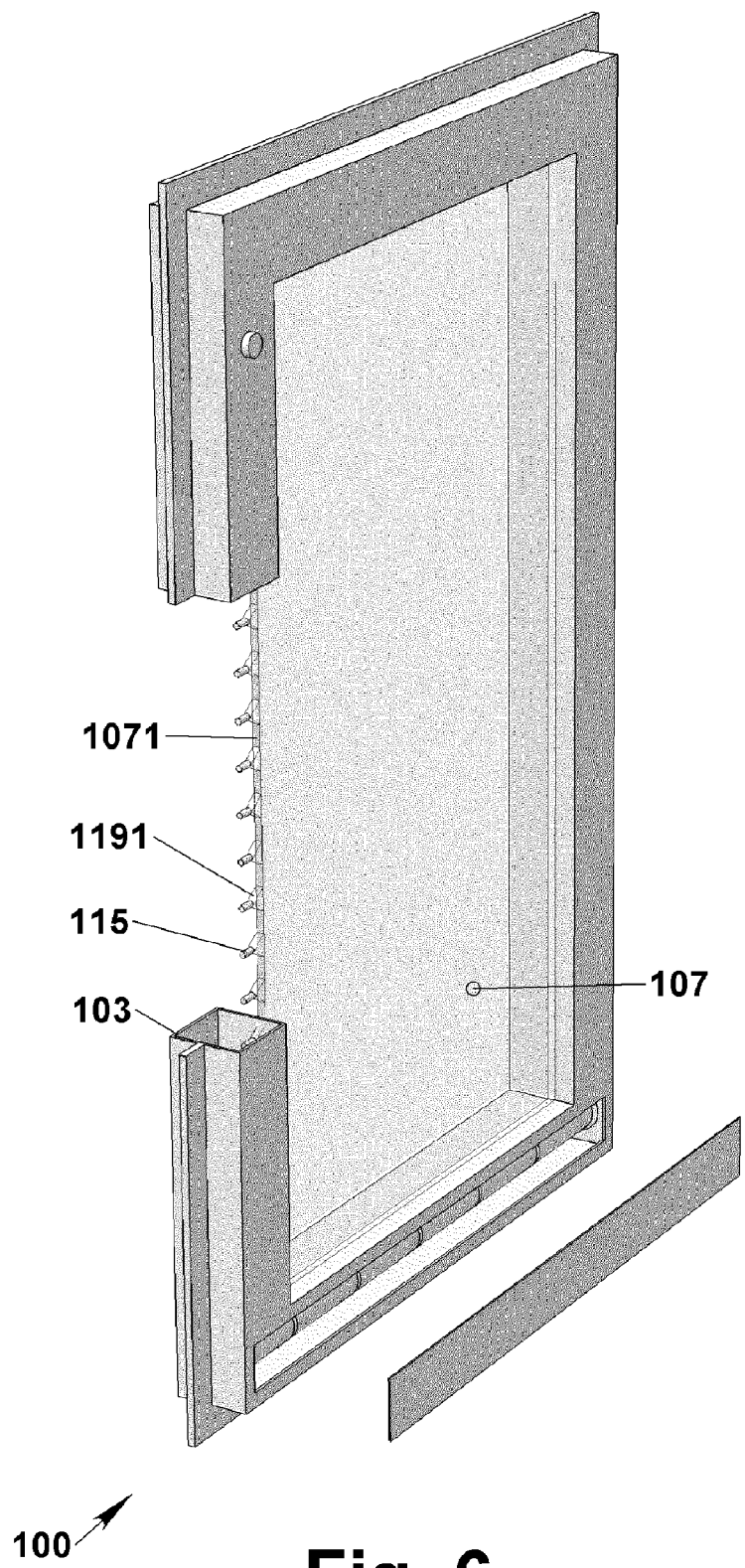
FIG. 6 is the interior perspective view of a window of fourth embodiment.

Referring to the FIGS. 1-4, a window frame 100 preferably configured for mounting in a building has an exterior side 105 including exterior bottom portion 1051, exterior side portions 1052, exterior top portion 1053 and window flange face 1054 that is immediately adjacent the framed window glass 107. The exterior side 105 in general is that side of the operationally assembled window frame 100 that is at the sun exposed exterior side of a building where the window frame 100 may be mounted as is well known in the art. On any or all portions 1051-1054 of the exterior side 105 one or more solar electric cells 117 may be mounted to capture the sun light and transform it into electrical energy as is well known in the art. A control circuit 143 in a first conductive connection 151 with the solar electric cell 143 passes the solar electric energy either to a battery 131 via a second conductive connection 152 and battery contact(s) 133 and/or via third conductive connection 153 to preferably one or more electrical light emitter 115 preferably on the frame's interior side 104. Light 119 may be emitted by the electrical light emitters 115 preferably into the interior of the building where the frame 103 is mounted. The electrical light emitter 115 may be preferably high energy efficient light emitting diodes as are well known in the art. The scope of the invention may include an embodiment in which the electrical light emitters 115 are positioned at other feasible locations of the frame 103. In particular and as is shown in FIG. 6, the electrical light emitter 115 may be placed inside frame 103 illuminating a lateral side 1071 of the framed window glass 107, in case of which the window glass 107 may be prepared with a surface coating or surface etch to diffract the laterally impinging light 1191 emitted from the electrical light emitters 115 in a fashion that makes the window glass 107 appear illuminant as may be well appreciated by anyone skilled in the art. In FIG. 6, the frame 103 is partially cut away to show the otherwise hidden electric light emitters 115.

The control circuit 143 may be controlled by a light switching device(s) 121 and/or 123 that is/are in a fourth conductive connection(s) 154/155 with the control circuit 143. The light switching device(s) 121 and/or 123 are mounted on the frame 103 and may be configured as manually operated electrical switch, as a motion sensor, as a light sensor or as any other well known device to selectively turn on and off lights. The exterior switching device 123 may for example take exterior switching parameters such as outside darkness. The inside switching device 121 may take for example interior switching parameters such motion in the room indicating the presence of a person.

The window frame 103 is preferably configured in a well known fashion as hollow profile, providing sufficient interior space for the control circuit 143 as well as for the cabling of the conductive connections 151-155 and particularly for a sufficiently sized battery compartment 127 featuring the battery contacts 133 and an optional remove able lid 135 for loading and eventually replacing one or more rechargeable batteries 131 stored in the battery compartment. This provides for installing sufficient battery power to provide bright illumination over an extended time in conjunction with high energy efficient light emitting diodes 115 as may be well appreciated by anyone skilled in the art. Moreover and as may be clear to anyone skilled in the art, solar power generation and storage may be easily scaled in conjunction with the frame's 103 size, which in turn may be a parameter for the desired illumination intensity and corresponding power consumption.

Figure 1:
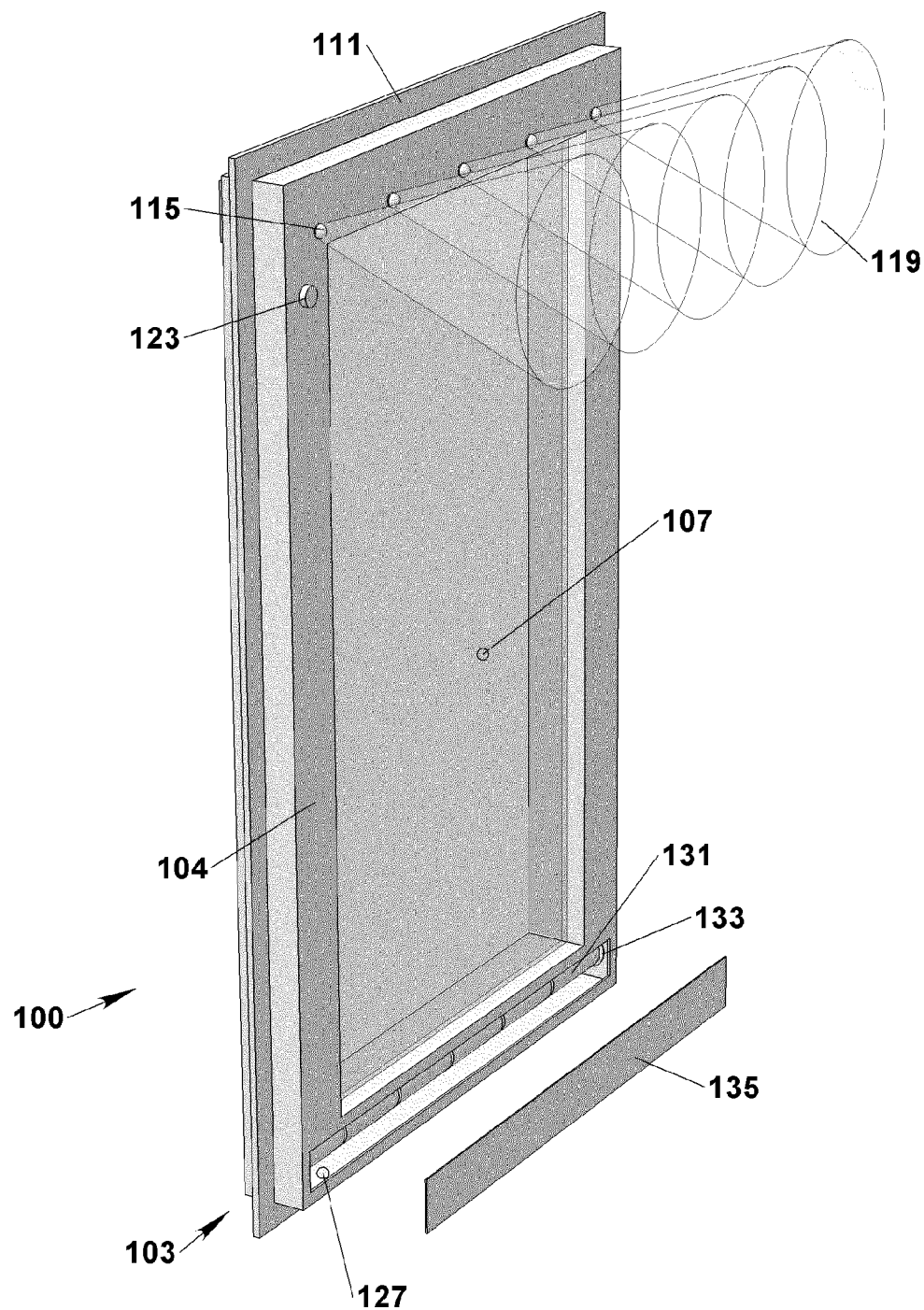
FIG. 1 is an interior perspective view of a window frame of a first embodiment.
Figure 2:
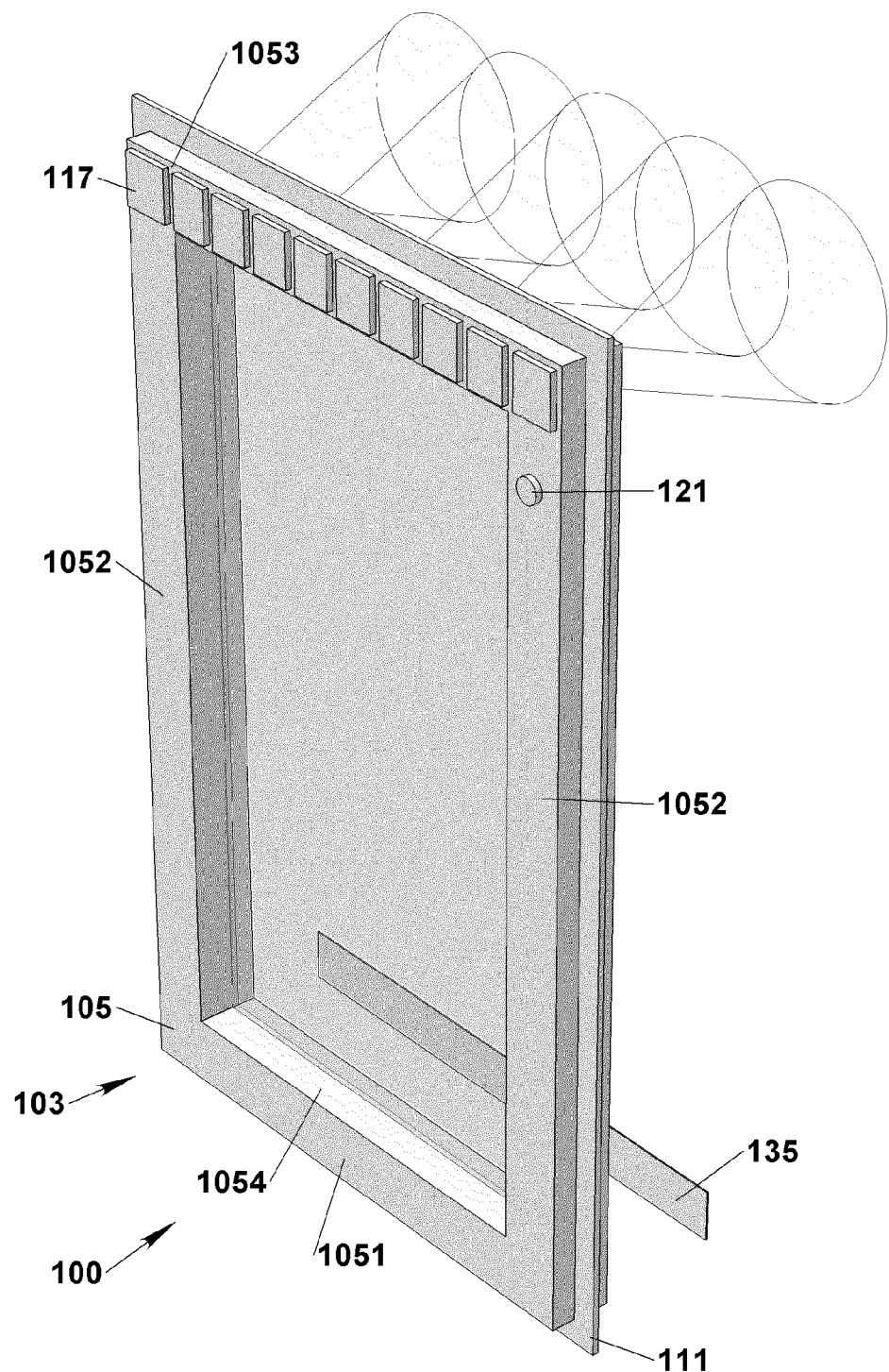
FIG. 2 is an exterior perspective view of the window frame of FIG. 1.
Figure 3:
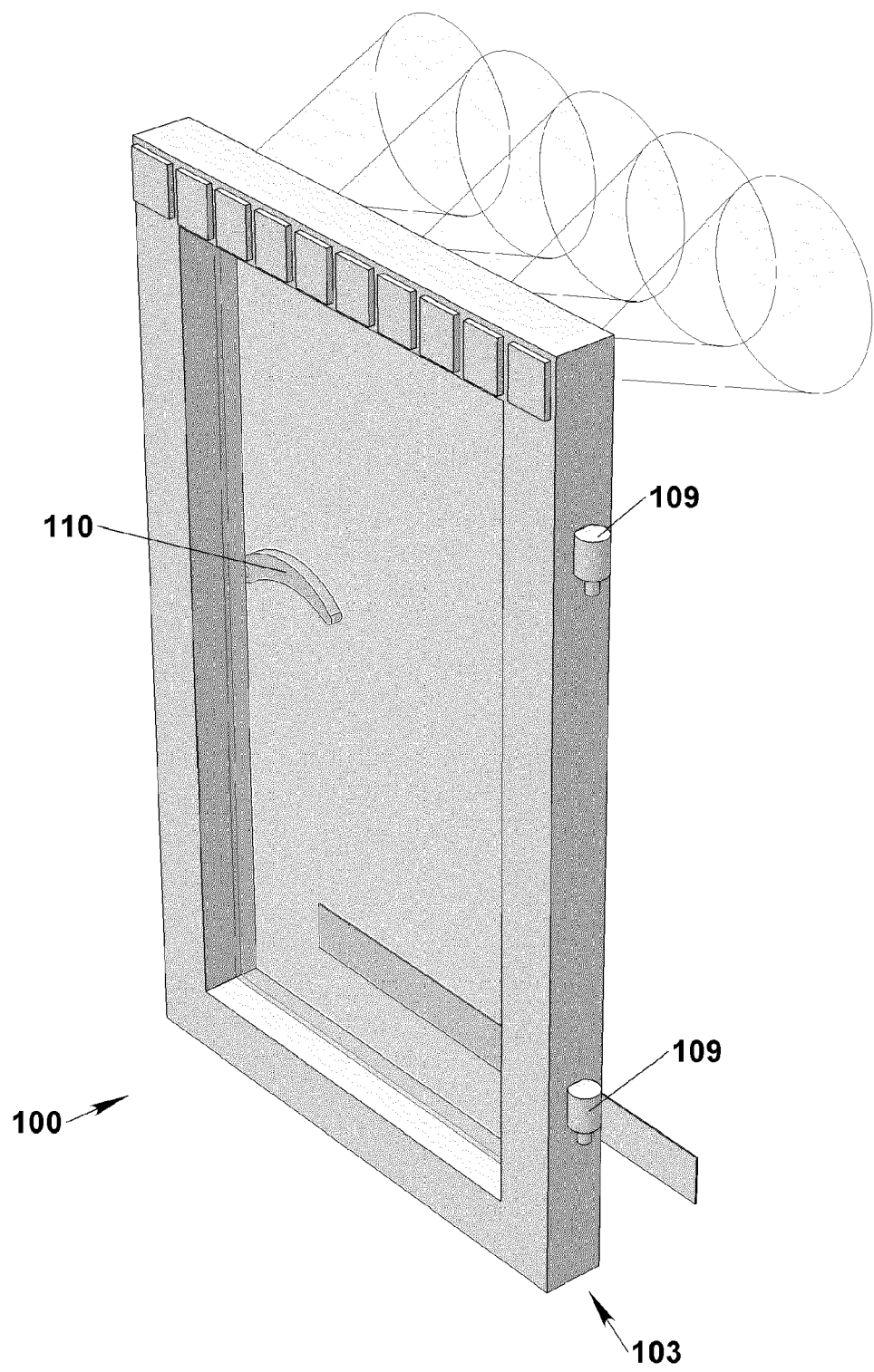
FIG. 3 is the exterior perspective view of a window frame of a second embodiment.
Figure 4:
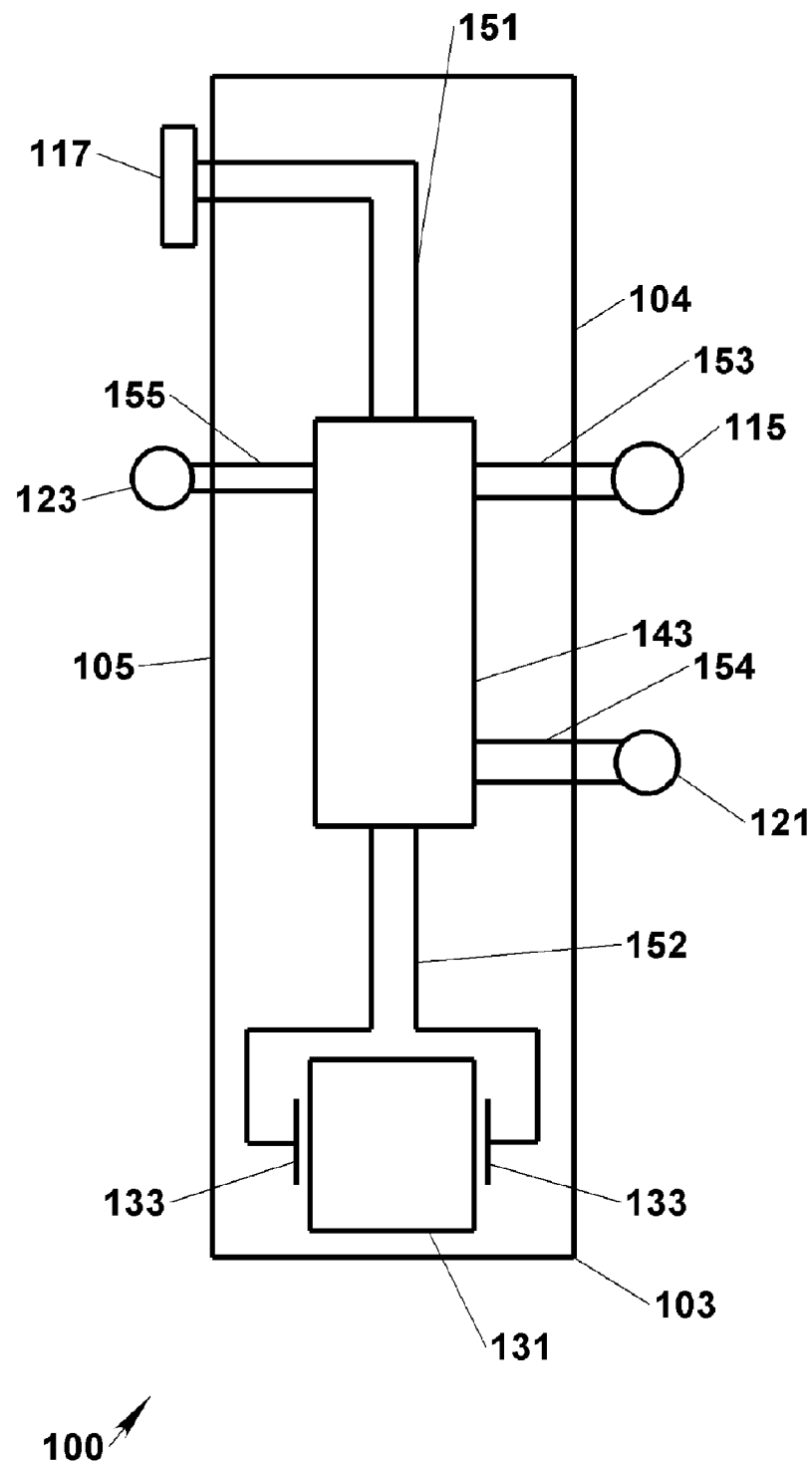
FIG. 4 is a system schematic of the present invention.
Figure 5:
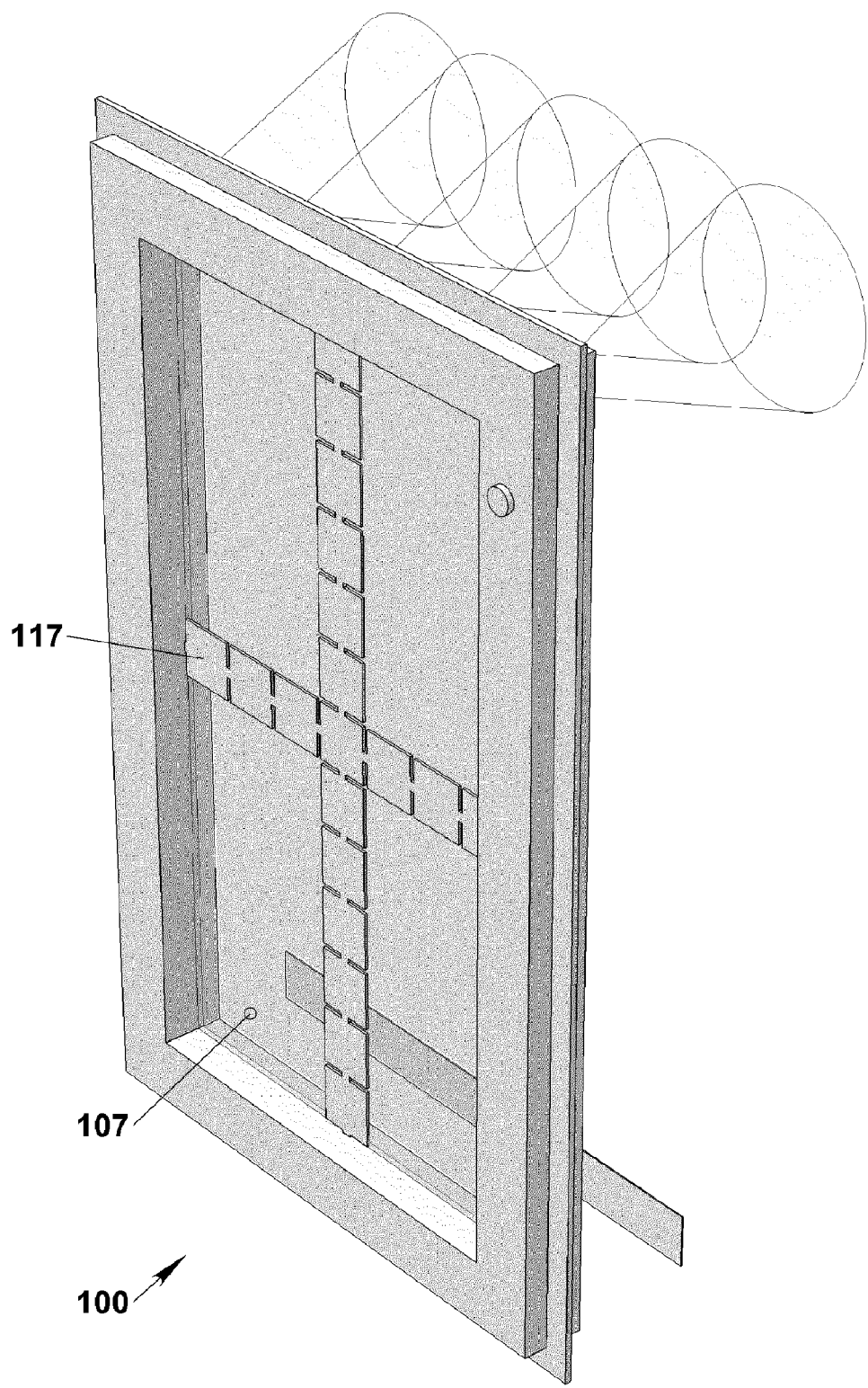
FIG. 5 is the exterior perspective view of a window of a third embodiment.

The window frame 103 may be rigidly mounted via rigid installation feature such as a well known assembly flange 111 or the like. Alternately, the window frame 103 may feature peripheral window hinges 109 and eventually a window closure 110 to be opened and closed. The window frame 103 with all integrated parts 117, 151-155, 143, 121/123, 115, 131, 133 may be easily retro fitted into existing buildings as a compact solar electricity providing device. The solar electric cells 117 may be conveniently accessible to be cleaned together with the window glass. As depicted in FIG. 5, the solar electric cells 117 may be additionally or alternately attached directly on the exterior side of the window glass 107 as may be well appreciated by anyone skilled in the art. Also, the frame 103 may have any well known configuration or shape as is well known in the art. During daylight, the solar electric cells 117 charge the battery(s) 131 via the control circuit 143 while sunlight through the window glass substitutes the light emitting diodes 115. In the absence of sufficient daylight, the light emitting diodes 115 may be selectively activated by the light switching device and powered by the rechargeable battery(s) 131. In that way a simple installable, easily scale able and compact system 100 is provided for solar powered interior lighting that may be easily maintained and retrofitted in existing buildings Accordingly, the scope of the invention described in the Figures and the Specification above is set forth by the following claims and their legal equivalent:

What is claimed is:

1. A window frame, comprising:
   a solar electric cell on an exterior side of said window frame;
   a control circuit in a first conductive connection with said solar electric cell; and
   an electrical light emitter being in a third conductive connection with said control circuit.

2. The window frame of claim 1, further comprising a peripheral window hinge.

3. The window frame of claim 1, further comprising a rigid installation feature.

4. The window frame of claim 1, wherein said electrical light emitter being on an interior side of said window frame.

5. The window frame of claim 1, wherein said electrical light emitter is a light emitting diode.

6. A window frame, comprising:
   a solar electric cell on an exterior side of said window frame;
   a control circuit in a first conductive connection with said solar electric cell; and
   a light switching device in a fourth conductive connection with said control circuit.

7. The window frame of claim 6, wherein said light switching device is an electrical switch.

8. The window frame of claim 6, wherein said light switching device is a motion sensor.

9. The window frame of claim 6, wherein said light switching device is a light sensor.

10. A window frame, comprising:
    a solar electric cell on an exterior side of said window frame;
    a control circuit in a first conductive connection with said solar electric cell; and
    a battery storage compartment comprising a battery contact, said battery contact being in a second conductive connection with said control circuit.

11. A compact solar powered lighting system comprising:
    a. a window having an exterior side and an interior side: side;
    b. a solar electric cell on said exterior side; and
    c. an electric light emitter positioned such that light is emitted on said interior side.

12. The compact solar powered lighting system of claim 11, wherein said electric light emitter is positioned with respect to a lateral side of a window glass of said window such that said electric light emitter substantially illuminates said lateral side.

13. The compact solar powered lighting system of claim 11, further comprising a rechargeable battery compartment housed inside a frame of said window, said rechargeable battery compartment comprising a battery contact being in conductive connection with said solar electric cell to receive and store solar electricity from said solar electric cell and being in conductive connection with said light emitter to power said electric light emitter with said stored solar electricity.

14. The compact solar powered lighting system of claim 11, further comprising a rechargeable battery housed inside a frame of said window, said rechargeable battery being in conductive connection with said solar electric cell to receive and store solar electricity from said solar electric cell and being in conductive connection with said light emitter to power said electric light emitter with said stored solar electricity.

15. The compact solar powered lighting system of claim 11, wherein said exterior side is on a frame of said window.

16. The compact solar powered lighting system of claim 11, wherein said exterior side is on a window glass of said window.

17. The compact solar powered lighting system of claim 11, wherein said electric light emitter is positioned on said interior side being on a frame of said window.

* * * * *